(12) United States Patent
Zhu et al.

(10) Patent No.: US 12,022,070 B2
(45) Date of Patent: Jun. 25, 2024

(54) VIDEO ENCODING AND DECODING METHODS AND APPARATUSES, ELECTRONIC DEVICE, AND STORAGE MEDIUM

(71) Applicant: Tencent Technology (Shenzhen) Company Limited, Guangdong (CN)

(72) Inventors: Han Zhu, Guangdong (CN); Xiaozhong Xu, Guangdong (CN); Shan Liu, San Jose, CA (US)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 111 days.

(21) Appl. No.: 17/720,812

(22) Filed: Apr. 14, 2022

(65) Prior Publication Data

US 2022/0239911 A1 Jul. 28, 2022

Related U.S. Application Data

(63) Continuation of application No. PCT/CN2021/092010, filed on May 7, 2021.

(30) Foreign Application Priority Data

May 25, 2020 (CN) .......................... 202010449427.5

(51) Int. Cl.
  *H04N 19/147* (2014.01)
  *H04N 19/117* (2014.01)
  (Continued)

(52) U.S. Cl.
  CPC ......... *H04N 19/117* (2014.11); *H04N 19/147* (2014.11); *H04N 19/172* (2014.11);
  (Continued)

(58) Field of Classification Search
  CPC .. H04N 19/117; H04N 19/147; H04N 19/172; H04N 19/176; H04N 19/182; H04N 19/196; H04N 19/80
  (Continued)

(56) References Cited

U.S. PATENT DOCUMENTS

2019/0273948 A1 9/2019 Yin et al.

FOREIGN PATENT DOCUMENTS

| CN | 108184129 A | 6/2018 |
| CN | 111052740 A | 4/2020 |

OTHER PUBLICATIONS

International Search Report and Written Opinion mailed Jul. 28, 2021 for International Application No. PCT/CN2021/092010.
(Continued)

*Primary Examiner* — Nguyen T Truong
(74) *Attorney, Agent, or Firm* — Crowell & Moring LLP

(57) ABSTRACT

Embodiments of this disclosure provide video encoding and decoding methods and devices relates to artificial intelligence (AI) technologies applied to video encoding and decoding and are implemented to perform video filtering, so that coding blocks with a relatively greater filtering gain may be selected for filtering after reconstruction, thereby improving filtering efficiency. An example video encoding method includes: obtaining a reconstructed video frame from encoded data of an encoded video frame, the encoded video frame comprising at least one encoding block; filtering the reconstructed video frame, to obtain a filtering gain of each pixel of the at least one encoding block; for an encoding block in the at least one encoding block, determining, according to a distribution of gains of pixels of the encoding block, whether the encoding block is to be filtered when being decoded at a decoder; and in response to determining that the encoding block is to be filtered when (Continued)

being decoded at a decoder, including into the encoded data of the encoded video frame an indication information for indicating that the encoding block is to be filtered into the encoded data.

20 Claims, 7 Drawing Sheets

(51) Int. Cl.
 *H04N 19/172* (2014.01)
 *H04N 19/176* (2014.01)
 *H04N 19/182* (2014.01)
 *H04N 19/196* (2014.01)
 *H04N 19/80* (2014.01)

(52) U.S. Cl.
 CPC ......... *H04N 19/176* (2014.11); *H04N 19/182* (2014.11); *H04N 19/196* (2014.11); *H04N 19/80* (2014.11)

(58) Field of Classification Search
 USPC .................................................... 375/240.16
 See application file for complete search history.

(56) References Cited

OTHER PUBLICATIONS

Extended European Search Report issued on European application No. 21812266.1 on Nov. 4, 2022, 9 pages.

Kim, Il-Koo et al., "HM7: High Efficiency Video Coding (HEVC) Test Model 7 Encoder Description," Joint Collaborative Team on Video Coding (JCT-VC) of ITU-T SG16 WP3 and ISO/IEC JTC1/SC29/WG11 9$^{th}$ Meeting: Geneva, CH, Apr. 27-May 7, 2012, 42 pages, CH.

Lin, Kai et al., "Residual in Residual Based Convolutional Neural Network In-loop Filter for AVS3", IEEE, Institute of Digital Media, Peking University, 2019 Picture Coding Symposium, Nov. 12-15, 2019, 5 pages, CN.

Office Action issued on Chinese Application 202010449427.5, dated Sep. 6, 2023, 4 pages.

VIDEO ENCODING AND DECODING METHODS AND APPARATUSES, ELECTRONIC DEVICE, AND STORAGE MEDIUM

RELATED APPLICATION

This application is a continuation and claims priority to International PCT Application No. PCT/CN2021/092010, filed on May 7, 2021, which is based on and claims priority to Chinese Patent Application No. 202010449427.5, filed on May 25, 2020, both entitled "VIDEO ENCODING AND DECODING METHODS AND APPARATUSES, ELECTRONIC DEVICE, AND STORAGE MEDIUM". Both of these prior patent applications are incorporated herein by reference in their entireties.

FIELD OF THE TECHNOLOGY

This application relates to the field of video processing technologies, and in particular, to video encoding and decoding methods and apparatuses, an electronic device, and a storage medium.

BACKGROUND OF THE DISCLOSURE

In recent years, with the development of deep learning technologies, many existing studies attempt to replace some modules in a conventional video encoding framework with deep learning models. For example, an end-to-end encoding framework has been proposed based on deep learning, especially on loop filtering tools, thereby significantly improving the encoding performance compared to conventional filtering tools. However, the use of the loop filtering tools based on deep learning increases the decoding complexity of a video decoder side. A current processing manner is to obtain a coding tree unit (CTU) with filtering gain enhancement through screening in a filtered video frame through rate distortion optimization (RDO), and filter the CTU at the video decoder side.

SUMMARY

An embodiment of this application provides a video encoding method, including:
  obtaining a reconstructed video frame from encoded data of a video frame, the video frame including at least one block;
  filtering the reconstructed video frame, to obtain a filtering gain of each pixel after filtering in the reconstructed video frame;
  for each block in the at least one block, determining, according to a distribution of filtering gains of pixels in the block, whether the block needs to be filtered in a case that the encoded data is decoded; and
  transmitting the encoded data of the video frame, the encoded data including indication information of a block that needs to be filtered.

An embodiment of this disclosure provides a video decoding method, including:
  obtaining encoded data of a video frame, the video frame including at least one block, the encoded data including indication information of a block that needs to be filtered, indication information of each block being determined according to a filtering gain distribution of filtering gains obtained by pixels in each block after filtering;
  obtaining a reconstructed video frame from the encoded data; and
  filtering the block that needs to be filtered in the reconstructed video frame based on the indication information.

An embodiment of this disclosure provides a video encoding apparatus, including:
  a decoding module, configured to obtain a reconstructed video frame from encoded data of a video frame, the video frame including at least one block;
  a filtering module, configured to filter the reconstructed video frame, to obtain a filtering gain of each pixel after filtering in the reconstructed video frame;
  a screening module, configured to: for each block in the at least one block, determine, according to a distribution of filtering gains of pixels in the block, whether the block needs to be filtered in a case that the encoded data is decoded; and
  a transmission module, configured to transmit the encoded data of the video frame, the encoded data including indication information of a block that needs to be filtered.

An embodiment of this disclosure provides a video decoding apparatus, including:
  an obtaining module, configured to obtain encoded data of a video frame, the video frame including at least one block, the encoded data including indication information of a block that needs to be filtered, indication information of each block being determined according to a filtering gain distribution of filtering gains obtained by pixels in each block after filtering;
  a video decoding module, configured to obtain a reconstructed video frame from the encoded data; and
  a video filtering module, configured to filter the block that needs to be filtered in the reconstructed video frame based on the indication information.

An embodiment of this disclosure provides a video encoding method, including:
  obtaining a reconstructed video frame from encoded data of an encoded video frame, the encoded video frame including at least one encoding block;
  filtering the reconstructed video frame, to obtain a filtering gain of each pixel after filtering in the reconstructed video frame and at least one filtered block corresponding to the at least one encoding block;
  for each encoding block in the at least one encoding block, determining, according to a distribution of filtering gains of pixels in a filtered block corresponding to the encoding block, whether the encoding block needs to be filtered in a case that the encoded video frame is decoded; and
  transmitting the encoded data of the encoded video frame, the encoded data of the encoded video frame including indication information of an encoding block that needs to be filtered.

An embodiment of this disclosure provides a video decoding method, including:
  obtaining encoded data of an encoded video frame, the encoded video frame including at least one encoding block, the encoded data of the encoded video frame including indication information of an encoding block that needs to be filtered in the at least one encoding block;
  obtaining a reconstructed video frame from the encoded data of the encoded video frame; and
  filtering, based on the indication information, a block in the reconstructed video frame and corresponding to the encoding block that needs to be filtered to obtain a filtered block, the indication information being related to a distribution of filtering gains of pixels in the filtered block.

An embodiment of this disclosure provides a video encoding apparatus, including:
- a decoding module, configured to obtain a reconstructed video frame from encoded data of an encoded video frame, the encoded video frame including at least one encoding block;
- a filtering module, configured to filter the reconstructed video frame, to obtain a filtering gain of each pixel after filtering in the reconstructed video frame and at least one filtered block corresponding to the at least one encoding block;
- a screening module, configured to: for each encoding block in the at least one encoding block, determine, according to a distribution of filtering gains of pixels in a filtered block corresponding to the encoding block, whether the encoding block needs to be filtered in a case that the encoded video frame is decoded; and
- a transmission module, configured to transmit the encoded data of the encoded video frame, the encoded data of the encoded video frame including indication information of an encoding block that needs to be filtered.

An embodiment of this disclosure provides a video decoding apparatus, including:
- an obtaining module, configured to obtain encoded data of an encoded video frame, the encoded video frame including at least one encoding block, the encoded data of the encoded video frame including indication information of an encoding block that needs to be filtered in the at least one encoding block;
- a video decoding module, configured to obtain a reconstructed video frame from the encoded data of the encoded video frame; and
- a video filtering module, configured to filter, based on the indication information, a block in the reconstructed video frame and corresponding to the encoding block that needs to be filtered to obtain a filtered block, the indication information being related to a distribution of filtering gains of pixels in the filtered block.

An embodiment of this disclosure provides an electronic device, including a memory, a processor, and a computer program stored on the memory and executable on the processor, the processor, when executing the computer program, implementing the operations in any foregoing method.

An embodiment of this disclosure provides a computer-readable storage medium, storing computer program instructions, the computer program instructions, when executed by a processor, implementing the operations in any foregoing method.

An embodiment of this disclosure provides a computer program product, including a computer program stored on a computer-readable storage medium, the computer program including program instructions, the program instructions, when executed by a processor, implementing the operations in any foregoing method.

According to the video encoding and decoding methods and apparatuses, the electronic device, and the storage medium provided in the embodiments of this disclosure, after a video encoder side completes encoding of a video frame, a reconstructed video frame is obtained from encoded data of the video frame, the reconstructed video frame is filtered, and filtering gains of pixels in the video frame and brought by filtering are obtained. Then, for a distribution of filtering gains of pixels in each block, whether the block needs to be filtered is determined, to obtain blocks with relatively great filtering gains for filtering, so that a video decoder side only filters the blocks with relatively great filtering gains during decoding and does not filter blocks with relatively small filtering gains. Therefore, calculation resources of the video decoder side are applied to blocks that can generate more apparent filtering gains, thereby reducing the decoding complexity and improving the filtering efficiency.

BRIEF DESCRIPTION OF THE DRAWINGS

To describe the technical solutions in the embodiments of this disclosure more clearly, the following briefly describes the accompanying drawings of this disclosure. The accompanying drawings in the following description are mere examples of this disclosure, and a person of ordinary skill in the art may derive other drawings from these accompanying drawings without creative efforts.

DESCRIPTION OF EMBODIMENTS

To make the objectives, technical solutions, and advantages of embodiments of this disclosure clearer, the following clearly and completely describes the technical solutions in the embodiments of this disclosure with reference to the accompanying drawings in the embodiments of this disclosure. Any quantity of elements in the accompanying drawings is merely an example but not a limitation, and any term is merely used for distinguishing, and does not have any limitation meaning.

YUV represents a color space. "Y" represents luminance or luma, that is, a grayscale value. "U" and "V" represent chrominance or chroma, and describe color and saturation levels of an image at each pixel.

Video signal: video signal may be acquired in two manners: camera capturing and computer generation. Due to different statistical characteristics of the two manners, corresponding compression encoding schemes may also be different.

Figure 1:
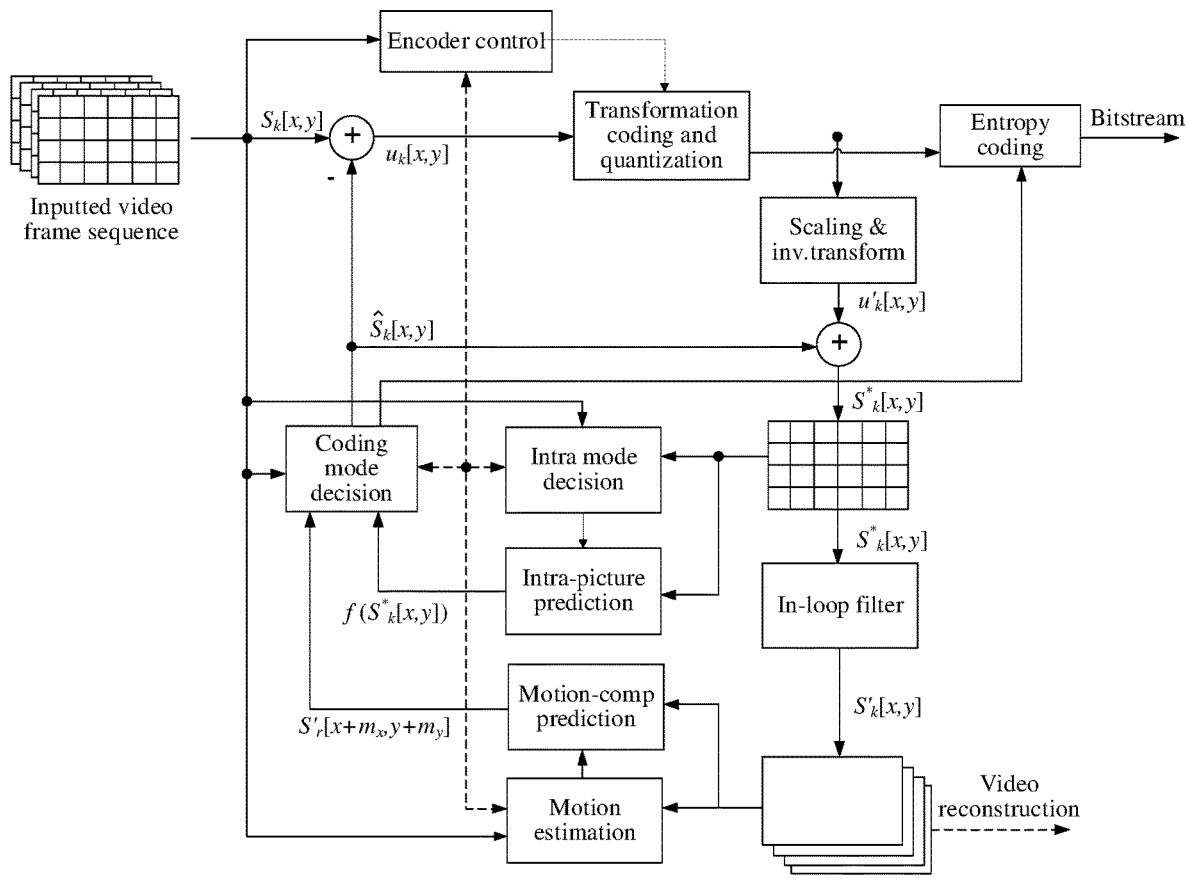
FIG. 1 is a basic flowchart of an exemplary video encoder.

FIG. 1 is a basic flowchart of an exemplary video encoder. Referring to FIG. 1, in modern mainstream video coding technologies, the international video coding standards High Efficiency Video Coding (HEVC) and Versatile Video Coding (VVC), and the China national video coding standard Audio Video Coding Standard (AVS) are used as an example, a series of operations and processing are performed on an inputted original video signal by using a hybrid coding framework as follows:

(1) Block partition structure:

According to a size of an inputted image, the inputted image may be divided into a plurality of non-overlapping processing units, and each processing unit performs a similar compression operation. The processing unit may be a coding tree unit (CTU) or a largest coding unit (LCU). Each CTU may continue to be divided more finely into one or more basic coding units, which are referred to as coding units (CUs). The CU is a most basic element in a coding stage. The following describes various coding manners that may be used for the CU. Each region obtained after performing block partition on a video frame may be used as a block. For example, one CTU may be used as a block, and one CU may also be used as a block.

(2) Predictive coding:

Predictive coding includes intra-frame prediction and inter-frame prediction. In the predictive coding, an original video signal is predicted by a selected reconstructed video signal to obtain a residual video signal. A video encoder side needs to select a most suitable one for a current CU from a plurality of possible predictive coding modes, and informs a video decoder side.

Intra-frame prediction refers to a case that a prediction signal of a current block (or a current CU) comes from an encoded and reconstructed region in a current image in which the current CU is located, namely, a position that most matches the current block is found from a current frame, and for details, reference may be made to spatial information.

Inter-frame prediction refers to a case that a prediction signal of a current block (or a current CU) comes from another encoded image (which is referred to as a reference image or a reference frame) that is different from a current image, and for details, reference may be made to temporal information. For example, inter-frame prediction includes: motion estimation (ME) and motion compensation (MC). The ME refers to determining a best corresponding image block of a current to-be-encoded CU in an encoded image (a reference frame) and calculating an offset (a motion vector) of the corresponding image block.

An I frame, namely, a reference frame, is also referred to as an intra picture. The I frame is generally a first frame in a video compression technology used by each Group of Pictures (GOP) and a Motion Picture Experts Group (MPEG). An I-frame method is an intra-frame compression method, and is also referred to as a "key frame" compression method. For example, the I-frame method is a compression technology based on Discrete Cosine Transform (DCT), and this algorithm is similar to a Joint Photographic Experts Group (JPEG) compression algorithm. In an encoding process, some video frame sequences are compressed into I frames, some are compressed into P frames, and some are compressed into B frames. During decoding, one frame of complete image can be reconstructed by only using data of the I frames. That is, reconstruction can be completed by only using the I frames without referring to other video frames, and other video frames can be reconstructed based on the I frames.

(3) Transform & Quantization: a residual video signal is transformed into a transform domain through a transform operation such as discrete Fourier transform (DFT) or discrete cosine transform (DCT), to generate a transform coefficient. When a lossy quantization operation is further performed on a signal in the transform domain, a certain amount of information is lost, helping a quantized signal compress expression. In some video coding standards, there may be more than one transform manner for selection. Therefore, the video encoder side also needs to select one transform manner thereof for a current encoding CU and informs the video decoder side. The fineness of quantization is generally determined by a quantization parameter (QP). If a value of the QP is relatively large, it indicates that coefficients with a larger value range may be quantized into a same output. As a result, larger distortion and a lower code rate are generally caused. On the contrary, if the value of the QP is relatively small, it indicates that coefficients with a smaller value range may be quantized into a same output. As a result, fewer distortion and a corresponding higher code rate are generally caused.

(4) Entropy coding or statistical coding: Statistical compression coding is performed on a quantized transform domain signal according to an occurrence frequency of each value, to finally output a binarized (0 or 1) compressed bitstream. In addition, other information such as a selected mode or a motion vector is generated through encoding, and entropy coding also needs to be performed to reduce a code rate. The statistical coding is a lossless coding method, to effectively reduce a code rate required to express a same signal. Common statistical coding manners include variable length coding (VLC) or context-based adaptive binary arithmetic coding (CABAC).

(5) Loop filtering: A reconstructed decoded image may be obtained through operations such as inverse quantization, inverse transform, and prediction compensation (reverse operations of the foregoing 2 to 4) on an encoded image. Compared with an original image, some information of the reconstructed decoded image is different from that of the original image due to an impact of quantization, resulting in distortion. Therefore, the reconstructed image needs to be filtered. A degree of distortion caused by quantization can be effectively reduced by using filters such as deblocking, a sample adaptive offset (SAO), or an adaptive loop filter (ALF). Because these filtered reconstructed images are used as a reference for subsequent encoded images to predict future signals, the foregoing filtering operation is also referred to as loop filtering, that is, a filtering operation in an encoding loop.

It can be seen according to the foregoing video encoding process that, in the video decoder side, after a compressed bitstream is obtained, for each CU, a decoder first performs entropy decoding to obtain various mode information and quantized transform coefficients. Each transform coefficient is inversely quantized and inversely transformed to obtain a residual signal. On the other hand, the decoder may obtain a prediction signal corresponding to the CU according to known encoding mode information. After adding the residual signal of the CU and the prediction signal, the decoder may obtain a reconstructed signal of the CU. Finally, an operation of loop filtering needs to be performed on a reconstructed value of the decoded image, to generate a final output signal.

In recent years, with the development of deep learning technologies, many existing studies attempt to replace some modules in a conventional video encoding framework with deep learning models, or an end-to-end encoding framework is proposed based on deep learning, especially on loop filtering tools. Compared with a conventional filtering tool, use of a loop filtering tool based on a deep learning technology can significantly improve the coding performance. The main idea of the loop filtering tool based on deep learning is to reconstruct a mapping relationship between reconstructed images and original images through neural network learning, which is generally used for replacing or helping the conventional filtering tool repair an information loss caused by lossy coding and suppress coding noise, thereby improving the quality of the reconstructed frame and improving the codec performance.

The deep learning-based method can effectively repair the noise and information loss introduced in lossy encoding and decoding methods and improve the codec performance. However, high complexity is also caused while high performance is brought, which seriously affects promotion and application of the loop filtering tool based on deep learning in reality. Therefore, the complexity of the deep leaning-based filtering tool needs to be reduced as much as possible while reserving the high performance. Currently, an AVS3 proposal performs convolutional neural network loop filter (CNNLF) model complexity simplification studies, a standard proposal M5016 only enables CNNLF on I frames, and a standard proposal M5129 proposes a temporal layers and closes level-4 and level-5 temporal layers with a low CTU hit rate according to the regularity presented on CTU hit rates in a random access (RA) test. As shown in Table 1, Table 1 is an switch-on or switch-off situation of CNN loop filtering for different temporal frames. In 720p and 1080p sequences, under an RA configuration, compared with a solution not enabling complexity optimization, the standard proposal M5016 reduces the complexity to 22% but has 3.47% Bjntegaard delta-rate (BD-rate) loss; and the standard proposal M5129 reduces the complexity to 77% but has 0.75% BD-rate loss.

TABLE 1

| Temporal layer | Included frames | Whether to open CNN loop filtering |
|---|---|---|
| 0 | 0 (I frame) | On |
| 1 | 16 | On |
| 2 | 8 | On |
| 3 | 4, 12 | On |
| 4 | 2, 6, 10, 14 | Off |
| 5 | 1, 3, 5, 7, 9, 11, 13, 15 | Off |

Although different degrees of time saving and performance loss are brought by the foregoing two solutions (the standard proposal M5016 and the standard proposal M5129), compared with the degree of reduced complexity, BD-rate losses are relatively apparent. In addition, even the CNNLF already sets a CTU level switch flag, the two solutions can only determine whether to use the CNNLF filtering tool according to frame levels.

Figure 2:
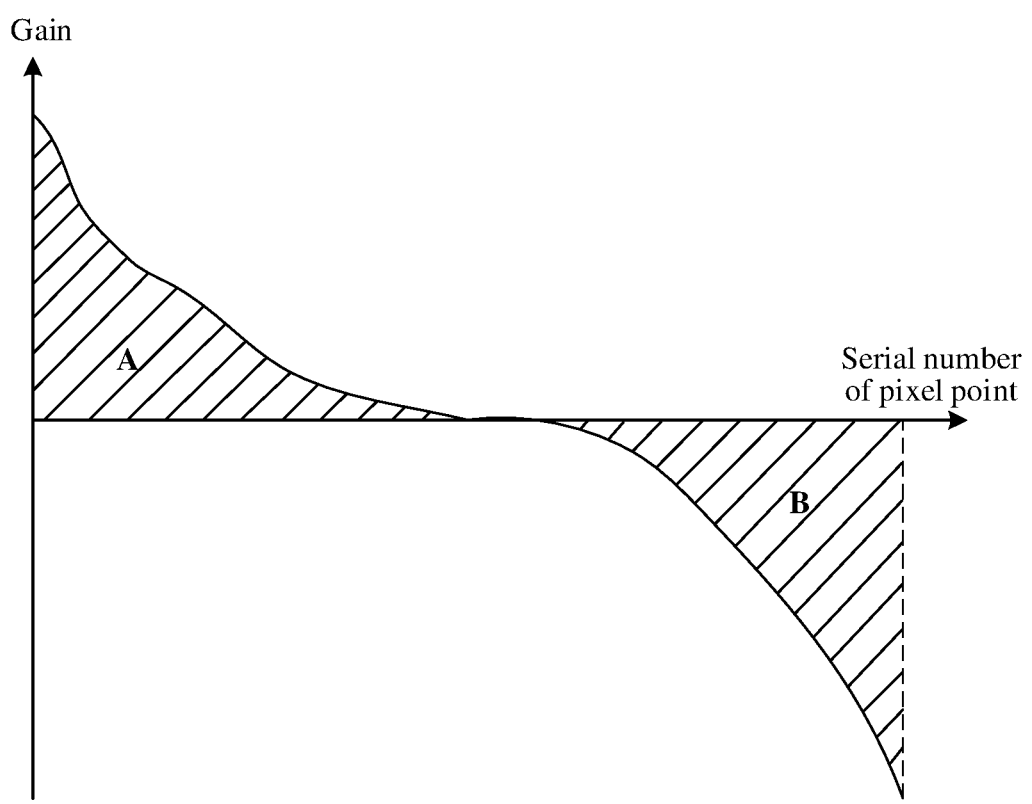
FIG. 2 shows an example distribution of filtering gains of pixels in a video frame on which CNNLF processing is performed.

By using a video frame as an example, in the embodiments of this disclosure, filtering gains obtained by pixels in the video frame after filtering are analyzed. For example, FIG. 2 shows a situation of filtering gains on pixels in a video frame, a filtering gain of each pixel may be measured by using a Euclidean distance, and a calculation method is as follows:

$$\text{Dist}_i = (I_{i,REC} - I_{i,org})^2 - (I_{i,CNN} - I_{i,org})^2$$

i represents a pixel serial number in a video frame, $I_{i,CNN}$ is a pixel parameter value corresponding to an $i^{th}$ pixel in a video frame on which CNNLF processing is performed, $I_{i,REC}$ is a pixel parameter value corresponding to an $i^{th}$ pixel in a video frame on which CNNLF processing is not performed, and $I_{i,org}$ is a pixel parameter value corresponding to an $i^{th}$ pixel in a coding tree unit (CTU) on which compression coding is not performed. In a case that $\text{Dist}_i$ is a positive number, it indicates that there is a filtering gain on the $i^{th}$ pixel on which CNNLF processing is performed, and a greater $\text{Dist}_i$ indicates a greater filtering gain. In a case that $\text{Dist}_i$ is a negative number, it indicates that there is a loss on the $i^{th}$ pixel on which CNNLF processing is performed, and a smaller $\text{Dist}_i$ indicates a greater loss. FIG. 2 represents a ranking result of the pixels in descending order of filtering gains. As can be known based on FIG. 2, although the entire video frame or CTU has a filtering gain, some pixels still have losses. As a result, a total filtering gain of the entire video frame or CTU is not apparent, the decoding complexity may be greatly increased if too much calculation resources are applied to video frames or CTUs whose filtering gains are not apparent, and the quality of a filtered image cannot be greatly improved.

Based on this, an embodiment of this disclosure provides a video encoding method. In the video encoding method, a video encoder side obtains, after completing encoding of a video frame, a reconstructed video frame from encoded data of the encoded video frame. The video encoder side filters the reconstructed video frame to obtain filtering gains obtained by pixels in filtered blocks of the reconstructed video frame, and determines, according to a distribution of the filtering gains of the pixels in each filtered block, whether an encoding block corresponding to the filtered block in the encoded video frame needs to be filtered when a video decoder side decodes the encoded video frame. The video encoder side transmits the encoded data of the encoded video frame to the video decoder side, and the encoded data of the encoded video frame includes indication information of an encoding block that needs to be filtered during decoding. In this way, when decoding the encoded video frame, the video decoder side may only filter the encoding block that needs to be filtered in the video frame according to the indication information in the encoded data of the video frame, thereby reducing the decoding complexity and improving the filtering efficiency in a case that the video quality is almost not affected or a decrease in the video quality is not apparent. A video frame may be divided into a plurality of blocks. In this embodiment of this disclosure, the block may be a CTU, a region (for example, CU) defined smaller than a CTU, a region including a plurality of CTUs, or a region obtained by using another division method in a frame, and certainly, the entire video frame may be alternatively used as a block. According to the foregoing video encoding method, whether the video decoder side needs to filter the encoding block corresponding to the filtered block in the encoded video frame may be determined according to the distribution of the filtering gains of the pixels in the filtered block. During decoding, the video decoder side only filters encoding blocks with a relatively great expected filtering gain after filtering and does not filter encoding blocks with a relatively small expected filtering gain after filtering, so that the calculation resources of the video decoder side are applied to blocks that can generate more apparent filtering gains, thereby improving the filtering efficiency.

The video encoding provided in this embodiment of this disclosure does not relate to a filter model used in an encoding and decoding process. Therefore, the video encoding method provided in this embodiment of this disclosure may be applicable to any filter model, and may be applied to a video codec or a post-processing product of video compression using a deep learning-based filter model.

After a design idea of the embodiments of this disclosure is described, the following briefly describes application scenarios to which the technical solutions in the embodiments of this disclosure are applicable. The application scenarios described below are merely used for describing rather than limiting the embodiments of this disclosure. During specific implementation, the technical solutions provided in the embodiments of this disclosure may be flexibly applicable according to an actual requirement.

Figure 3:
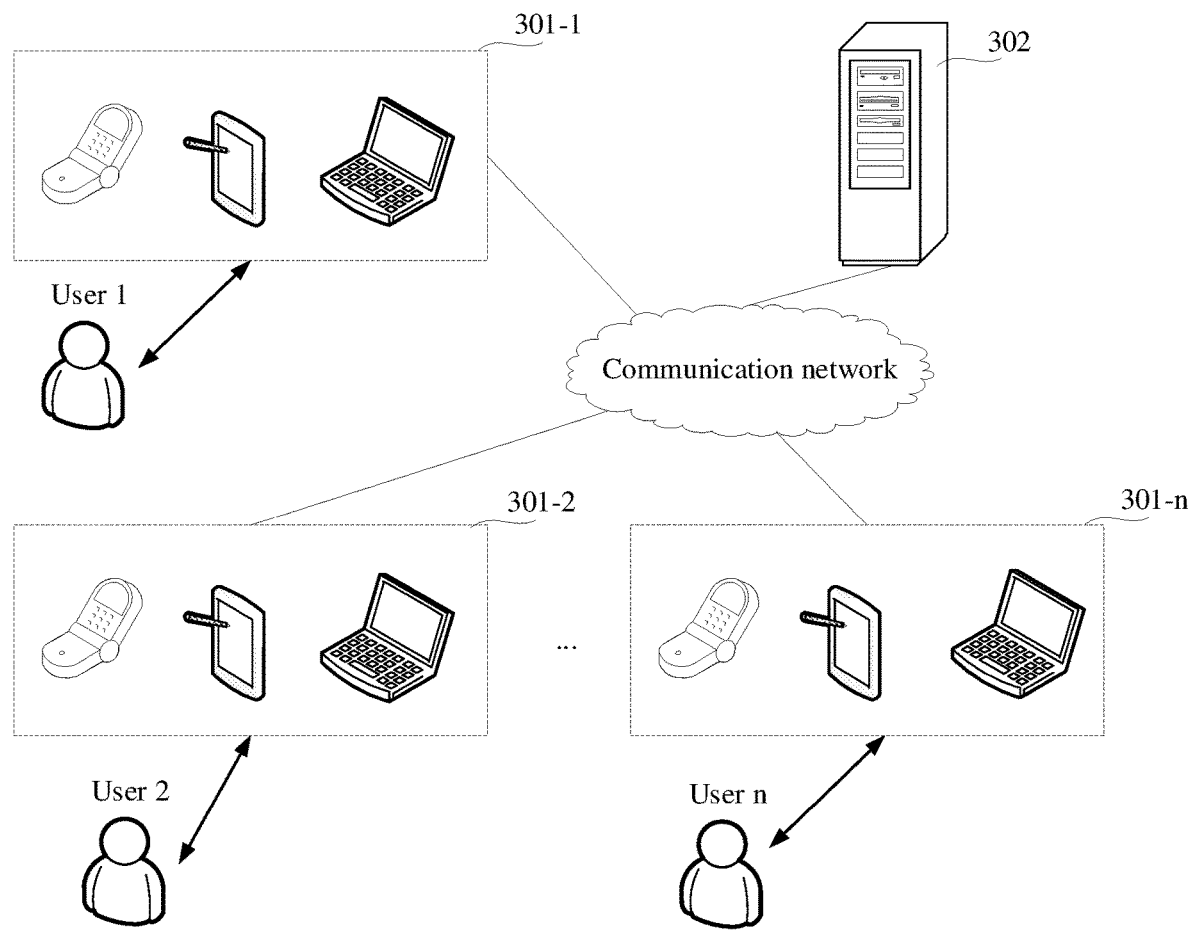
FIG. 3 is a schematic diagram of an example application scenario of video encoding and decoding methods according to an embodiment of this disclosure.

FIG. 3 is a schematic diagram of an application scenario of video encoding and decoding methods according to an embodiment of this disclosure. The application scenario includes a terminal device 301 (including a terminal device 301-1, a terminal device 301-2, . . . , and a terminal device 301-n) and a server 302. The terminal device 301 and the server 302 may be connected through a wireless communication network or a wired communication network. The terminal device 301 includes, but is not limited to, electronic devices such as a desktop computer, a mobile phone, a mobile computer, a tablet computer, a media player, a smart wearable device, a smart TV, an in-vehicle device, or a personal digital assistant (PDA). The server 302 may be an independent physical server, or may be a server cluster including a plurality of physical servers or a distributed system, or may be a cloud server providing basic cloud services, such as cloud computing, a cloud database, cloud computing, a cloud function, cloud storage, a network service, cloud communication, a middleware service, a domain name service, a security service, a content delivery network (CDN), big data, and an artificial intelligence platform.

When a user of the terminal device 301 intends to view a video, the user may transmit a video obtaining or retrieving request by using the terminal device 301 to the server 302. The server 302 searches a corresponding video based on the video obtaining request, encodes the video to obtain an encoded video stream, and transmits the video stream to the terminal device 301. The terminal device 301 decodes and filters the received video stream, to play the video on the terminal device 301. In this case, the server 302 is equivalent to a video encoder side, and the terminal device 301 is equivalent to a video decoder side.

When a user of the terminal device 301-1 intends to push a video to another user (for example, the terminal device 301-2) through the server 302, the terminal device 301-1 encodes the video to obtain an encoded video stream and transmits the video stream to the server 302, and the server 302 then forwards the video stream to the terminal device 301-2. The terminal device 301-2 decodes and filters the received video stream, to play the video on the terminal device 301-2. In this case, the terminal device 301-1 is equivalent to a video encoder side, and the terminal device 301-2 is equivalent to a video decoder side.

Certainly, the video encoding and decoding methods provided in the embodiments of this disclosure are not limited to the application scenario shown in FIG. 3, and may also be applied to another possible application scenario, which is not limited in the embodiments of this disclosure. Functions that can be implemented by devices in the application scenario shown in FIG. 3 are described in the following method embodiments together. Details are not described herein.

To further describe the technical solutions provided in the embodiments of this disclosure, the technical solutions are described in detail below with reference to the accompanying drawings and specific embodiments. Although the embodiments of this disclosure provide method operational steps shown in the following embodiments or accompanying drawings, more or fewer operational steps may be included in the methods based on conventional efforts or without creative efforts. In the steps in which no necessary causal relationship logically exists, the execution order of the steps is not limited to the execution orders provided in the embodiments of this disclosure.

The technical solutions provided in the embodiments of this disclosure are described below with reference to the application scenario shown in FIG. 3. Any video encoding method provided in the embodiments of this disclosure may be applicable to any video encoder side such as the terminal device or server shown in FIG. 3; and any video decoding method provided in the embodiments of this disclosure may be applicable to any video decoder side such as the terminal device or server shown in FIG. 3. Any video decoding method provided in the embodiments of this disclosure may be applicable to any video decoder side such as the terminal device shown in FIG. 3.

Figure 4A:
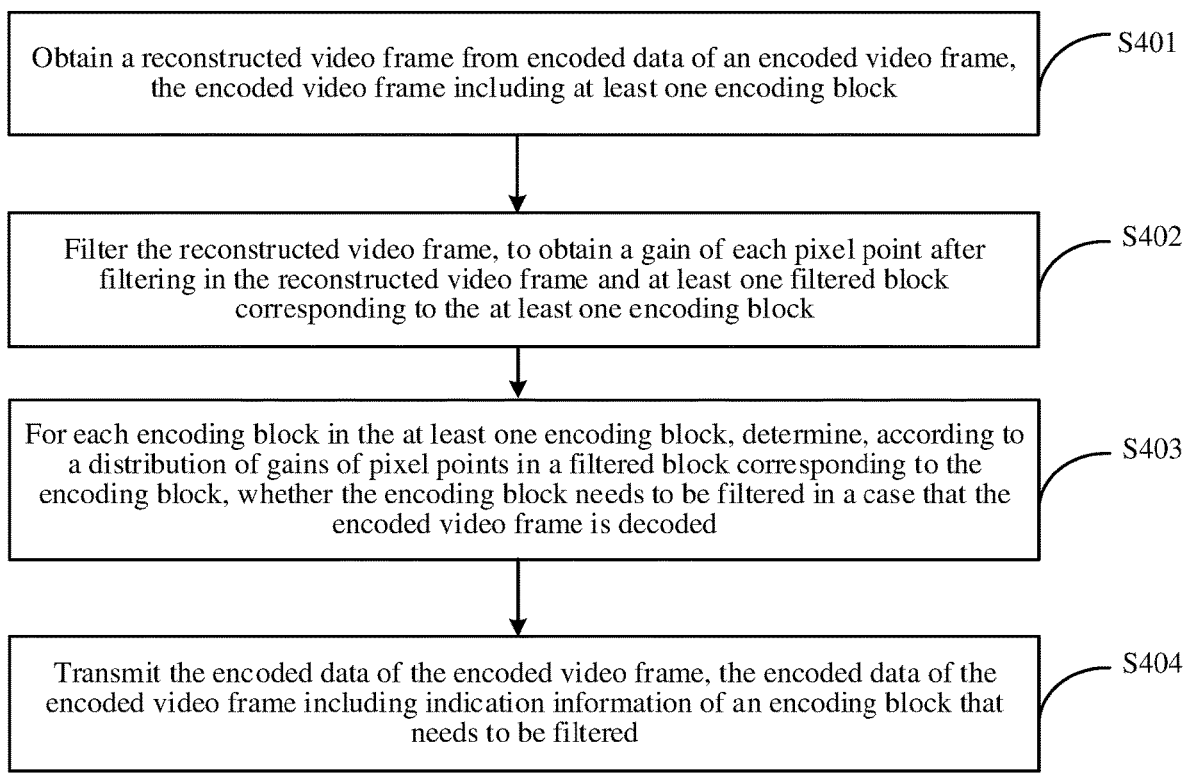
FIG. 4A is a schematic flowchart of an example video encoding method according to an embodiment of this disclosure.

Referring to FIG. 4A, an embodiment of this disclosure provides a video encoding method, including the following steps:

S401: Obtain a reconstructed video frame from encoded data of an encoded video frame, the encoded video frame including at least one encoding block.

According to this embodiment of this disclosure, the video encoder side can reconstruct the video frame from the encoded data of the encoded video frame, to obtain a reconstructed video frame. A block is a region obtained by performing block division on a video frame. During actual application, the block may be a CTU in a video frame, a region (for example, CU) defined smaller than a CTU, a region including a plurality of CTUs, or a region obtained by dividing the inside of a video frame by using another block division method, which is not limited in the embodiments of this disclosure. Certainly, the entire video frame may be alternatively used as a block (namely, a frame-level block). In this case, whether a video frame corresponding to the filtered video frame needs to be filtered during decoding may be determined according to a distribution of filtering gains of pixels in the filtered video frame. Therefore, when the block is a region such as a CTU or a CU smaller than the video frame, one video frame may include two or more blocks.

During specific implementation, the process of obtaining a reconstructed video frame from encoded data of an encoded video frame may include, for example, performing operations such as inverse quantization, inverse transformation, and predictive compensation on the encoded data of the encoded video frame, and details are not described again.

S402: Filter the reconstructed video frame, to obtain a filtering gain of each pixel after filtering in the reconstructed video frame and at least one filtered block corresponding to the at least one encoding block.

In step S402, a filtering method used by the video encoder side may be the same as a filtering method used by the video decoder side. In this embodiment of this disclosure, the filtering method used by the video decoder side is not limited, and the video decoder side may use a CNNLF model to perform filtering or may use another filter model.

During specific implementation, the video encoder side first encodes an original video to obtain encoded data, and then obtains a reconstructed video frame from encoded data of each encoded video frame. The video encoder side then filters each reconstructed video frame to obtain a filtered image (a filtered video frame) corresponding to each reconstructed video frame. The video encoder side then obtains a filtering gain obtained by each pixel after filtering in the reconstructed video frame (each pixel in the filtered video frame) based on a certain evaluation standard. A greater filtering gain of a pixel indicates a more apparent improvement effect of filtering on the quality of the pixel, and on the contrary, a smaller filtering gain of a pixel indicates a less apparent improvement effect of filtering on the quality of the pixel.

According to this embodiment of this disclosure, the video encoder side may obtain the filtering gain obtained by each pixel after filtering in the reconstructed video frame in the following manner. For example, the video encoder side may obtain, for each pixel in the reconstructed video frame, the filtering gain obtained by the pixel after filtering based on a first degree of difference between a pixel parameter value corresponding to the pixel before encoding and a pixel parameter value after decoding and a second degree of difference between the pixel parameter value corresponding to the pixel before encoding and a pixel parameter value after filtering. For example, the filtering gain of each pixel after filtering in the reconstructed video frame may be calculated by using the following Formula 1:

$$\text{Dist}_i = (I_{i,REC} - I_{i,org})^2 - (I_{i,CNN} - I_{i,org})^2 \quad \text{(Formula 1)}$$

i represents a pixel serial number in a reconstructed video frame, $I_{i,CNN}$ is a pixel parameter value of an $i^{th}$ pixel in a video frame on which filtering is performed, $I_{i,REC}$ is a pixel parameter value of an $i^{th}$ pixel in a video frame on which filtering is not performed, and $I_{i,org}$ is a pixel parameter value of an $i^{th}$ pixel in a video frame on which compression coding is not performed. In a case that $\text{Dist}_i$ is a positive number, it indicates that there is a filtering gain on the pixel after filtering, and a greater $\text{Dist}_i$ indicates a greater filtering gain. In a case that $\text{Dist}_i$ is a negative number, it indicates that there is a loss on the pixel after filtering, and a smaller $\text{Dist}_i$ indicates a greater loss.

During actual application, the pixel parameter value may be at least one of the following: a Y component, a U component, and a V component, and the pixel parameter value may alternatively be a grayscale value or an RGB value.

S403: For each encoding block in the at least one encoding block, determine, according to a distribution of filtering gains of pixels in a filtered block corresponding to the encoding block, whether the encoding block needs to be filtered in a case that the encoded video frame is decoded. The term "filtering gain" represents a loop filtering gain. The terms "filtering gain" and "gain" are used interchangeably.

During specific implementation, the video encoder side may determine a block that needs to be filtered by the video decoder side in each encoded video frame in the following manner. For example, the video encoder side determines, according to a distribution of filtering gains of filtered blocks in the reconstructed video frame, a filtering gain threshold corresponding to the filtered blocks; and determines an encoding block corresponding to a filtered block whose filtering gain is greater than the filtering gain threshold in the encoded video frame as an encoding block that needs to be filtered in a case that the video decoder side decodes the encoded video frame. Namely, a filtering gain of the encoding block after filtering is expected to be relatively great. In this way, the video encoder side may determine an appropriate filtering gain threshold based on the distribution of the filtering gains of the blocks after filtering in the reconstructed video frame, and obtain an encoding block with a relatively great expected filtering gain after filtering based on the filtering gain threshold. Therefore, the video decoder side may be informed to filter the obtained encoding block with a relatively great expected filtering gain after filtering and not to filter encoding blocks with a relatively small expected filtering gain after filtering during decoding, so that calculation resources are applied to blocks greatly improving the image quality, thereby reducing the decoding complexity and improving the filtering efficiency.

During specific implementation, in a case that the video encoder side determines an encoding block in the encoded video frame that needs to be filtered by the video decoder side during decoding based on step S403, switch information of the encoding block may be set as "on"; and in a case that the video encoder side determines an encoding block that does not need to be filtered during decoding based on step S403, switch information of the encoding block may be set as "off". For example, switch information of an encoding block may be represented by using a flag identifier, when a flag of an encoding block is 1, it indicates "on", namely, the encoding block needs to be filtered during decoding, and when the flag of the encoding block is 0, it indicates "off", namely, the encoding block does not need to be filtered during decoding.

In addition, corresponding switches may be set respectively for encoding blocks of each level. For example, the entire encoded video frame corresponds to a frame-level switch. When the frame-level switch frame_flag is 0, it indicates that the encoded video frame does not need to be filtered. When the frame-level switch frame_flag is 1, it indicates that the encoded video frame needs to be filtered. For example, one encoded video frame may be divided into a plurality of CTUs, so that CTU-level switches may be further set, and each CTU corresponds to a CTU switch. When a CTU-level switch CTU_flag of one CTU is 0, it indicates that the CTU does not need to be filtered. When a CTU-level switch CTU_flag of one CTU is 1, it indicates that the CTU needs to be filtered. Only when the frame-level switch frame_flag of an encoded video frame is 1, whether each CTU in the encoded video frame needs to be filtered is required to be determined according to the CTU-level switch; and when the frame-level switch frame_flag of an encoded video frame is 0, the CTU-level switch does not need to be considered.

S404: Transmit the encoded data of the encoded video frame, the encoded data of the encoded video frame including indication information of an encoding block that needs to be filtered.

During specific implementation, encoded data of each encoded video frame carries indication information, and the indication information is used for indicating an encoding block that needs to be filtered such as CNNLF processing in the encoded video frame to the video decoder side. For example, the indication information may include a flag identifier corresponding to each encoding block in a video frame. When the flag of an encoding block is 1, it indicates that the encoding block needs to be filtered during decoding, and when the flag of an encoding block is 0, it indicates that the encoding block does not need to be filtered during decoding. In another example, the indication information may include serial numbers of blocks that need to be filtered in the encoded video frame. For example, if the indication information includes serial numbers 1, 4, and 5, the first block, the fourth block, and the fifth block in the encoded video frame need to be filtered. In some other implementations, the filtering indication for the video blocks may include a bit-map.

During specific implementation, the video encoder side writes the indication information into the encoded data of the encoded video frame and transmits the encoded data to the video decoder side. The video decoder side obtains a reconstructed video frame from the encoded data of the encoded video frame, filters the encoding block that needs to be filtered in the encoded video frame based on the indication information in the encoded data of the encoded video frame, and obtains a filtered video frame and plays the filtered video frame.

According to the video encoding method provided in this embodiment of this disclosure, after the video encoder side completes encoding of a video frame, a reconstructed video frame is obtained from encoded data of the encoded video frame, the reconstructed video frame is filtered, and filtering gains of pixels in the reconstructed video frame and brought by filtering are obtained. Then, for a distribution of filtering gains of pixels in each filtered block, whether an encoding block (a block with a relatively great expected filtering gain after filtering) corresponding to the filtered block in the encoded video frame needs to be filtered by the video decoder side is determined, to obtain encoding blocks corresponding to filtered blocks with relatively great filtering gains for filtering, so that the video decoder side only filters the blocks with relatively great expected filtering gains after filtering during decoding and does not filter blocks with relatively small expected filtering gains after filtering. Therefore, calculation resources of the video decoder side are applied to blocks that can generate more apparent filtering gains, thereby reducing the decoding complexity and improving the filtering efficiency.

During specific implementation, the video encoder side may determine a ratio of a positive filtering gain of each filtered block according to the distribution of the filtering gains of the pixels in the filtered block; and in a case that the ratio of the positive filtering gain of the filtered block is less than a filtering gain ratio threshold, determine that an encoding block corresponding to the filtered block does not need to be filtered in a case that the encoded video frame is decoded, or otherwise, determine that the encoding block corresponding to the filtered block needs to be filtered in a case that the encoded video frame is decoded.

Specifically, the video encoder side may determine the ratio of the positive filtering gain of the filtered block in the following manner: determining an absolute value of a sum of filtering gains of pixels whose filtering gains are positive in the filtered block as the positive filtering gain of the filtered block; determining an absolute value of a sum of filtering gains of pixels whose filtering gains are negative in the filtered block as a negative filtering gain of the filtered block; determining a sum of the positive filtering gain and the negative filtering gain of the filtered block as a total filtering gain of the filtered block; and obtaining the ratio of the positive filtering gain of the filtered block according to a ratio of the positive filtering gain of the filtered block to the total filtering gain.

FIG. 2 is used as an example, a sum of filtering gains of pixels whose filtering gains are positive in the filtered block is $Sum_A$ and corresponds to an area covered by a region A in FIG. 2, a sum of filtering gains of pixels whose filtering gains are negative in the filtered block is $Sum_B$ and corresponds to an area covered by a region B in FIG. 2, and a ratio of the positive filtering gain is $$r = \frac{|Sum_A|}{|Sum_A| + |Sum_B|},$$

where $|Sum_A|$ represents a part where a filtering gain is increased in the filtered block, namely, the positive filtering gain, and $|Sum_B|$ represents a part where a filtering gain is lost in the filtered block, namely, the negative filtering gain. When r is greater than 0.5, it indicates that the total filtering gain obtained by the entire filtered block is greater than 0, namely, the quality of the block is improved overall after filtering. According to ratio situations of the part where a filtering gain is increased and the part where a filtering gain is lost of the pixels in the filtered block, whether the encoding block corresponding to the filtered block needs to be filtered by the video decoder side during decoding is determined, to obtain encoding blocks with relatively great expected filtering gains after filtering for filtering, thereby improving the filtering efficiency during decoding.

During specific implementation, the video encoder side may preset a filtering gain ratio threshold, namely, each filtered block may be compared with the same filtering gain ratio threshold.

During specific implementation, the video encoder side may further determine the filtering gain ratio threshold corresponding to each filtered block in the following manner: obtaining a filtering gain statistical feature value of the filtered block according to the distribution of the filtering gains of the pixels in the filtered block; and determining the filtering gain ratio threshold corresponding to the filtered block according to the filtering gain statistical feature value of the filtered block.

During specific application, the filtering gain statistical feature value includes, but is not limited to: an average value, a median, and a standard deviation. Statistics collection may be performed on the filtering gains of all pixels in the reconstructed video frame to obtain a filtering gain statistical feature value, and statistics collection may be alternatively performed only on the filtering gains of the pixels whose filtering gains are positive to obtain a filtering gain statistical feature value.

An example in which the average value is used as the filtering gain statistical feature value is used. The video encoder side may calculate a filtering gain average value $V=(\Sigma_{i=1}^{N} Dist_i)/N$ of the pixels whose filtering gains are positive in the filtered block, where N is the quantity of the pixels whose filtering gains are positive in the filtered block, $Dist_i$ is a filtering gain of an $i^{th}$ pixel whose filtering gain is positive in the filtered block, and V is used as the filtering gain statistical feature value of the filtered block. Alternatively, the video encoder side may calculate a filtering gain average value $V=(\Sigma_{i=1}^{N} Dist_i)/N$ of all the pixels in the filtered block, where N is the quantity of the pixels included in the filtered block, $Dist_i$ is a filtering gain of an $i^{th}$ pixel in the filtered block, and V is used as the filtering gain statistical feature value of the filtered block.

According to this embodiment of this disclosure, the video encoder side may obtain the filtering gain ratio threshold corresponding to the filtering gain statistical feature value of the filtered block according to a preset mapping relationship between the filtering gain statistical feature value and the filtering gain ratio threshold.

During actual application, the mapping relationship between the filtering gain statistical feature value D and the filtering gain ratio threshold G may be represented by using the following piecewise function (Formula 2):

$$G = \begin{cases} g_1, D \in [a_0, a_1] \\ g_2, D \in [a_1, a_2] \\ \vdots \\ g_n, D \in [a_{n-1}, a_n] \end{cases} \quad \text{(Formula 2)}$$

The quantity n of pieces, a range $a_n$, and a corresponding $g_n$ are all valued according to experience, and $0 \leq a_n$, $g_n \leq 1$.

Further, it may be limited that $a_0 < a_1 < a_2 < \ldots < a_{n-1} < a_n$ and $g_1 < g_2 < \ldots < g_n$. That is, a greater filtering gain statistical feature value D indicates a greater filtering gain ratio threshold G.

During specific implementation, it may be further defined that the filtering gain ratio threshold G is positively correlated with the filtering gain statistical feature value D. For example, the mapping relationship between D and G may alternatively be $G = k \times D + b$, where k and b may be valued according to experience.

When the filtering gain ratio threshold is relatively small, certain filtering gain improvement may be obtained in a case of reducing the complexity apparently; and when the filtering gain ratio threshold is relatively great, the decoding complexity may be reduced in a case that a decrease in performance is not apparent. Therefore, during actual application, the filtering gain ratio threshold may be adjusted according to an optimization requirement for the filtering efficiency. Specifically, the filtering gain ratio threshold may be adjusted conveniently by modifying parameters in the mapping relationship. For example, when the filtering complexity needs to be reduced greatly, a relatively small filtering gain ratio threshold may be selected by adjusting the parameters in the mapping relationship; and when an apparent filtering gain needs to be obtained, a relatively great filtering gain ratio threshold may be selected by adjusting the parameters in the mapping relationship.

During specific implementation, one video frame may be divided into blocks of a plurality of levels. For example, an entire video frame may be used as a frame-level block, one video frame may be divided into a plurality of CTUs, and each CTU may be further divided into a plurality of CUs. By analogy, a plurality of levels may be obtained through division. Based on this, the video encoder side may determine indication information corresponding to the blocks of a plurality of levels in the video frame, and the video decoder side determines whether blocks of each level need to the filtered, for example, whether CNNLF processing needs to be performed level by level during decoding.

For example, the video encoder side determines, based on the distribution of the filtering gains of the pixels after filtering in the reconstructed video frame, whether the encoded video frame corresponding to the reconstructed video frame needs to be filtered by the video decoder side during decoding, and writes indication information whether the encoded video frame needs to be filtered into the encoded data of the encoded video frame. In this embodiment of this disclosure, the indication information corresponding to the encoded video frame is referred to as frame-level switch information. Meanwhile, the video encoder side may further determine a filter switch corresponding to each encoding block in the encoded video frame. For example, whether a CTU needs to be filtered during decoding is determined based on a distribution of filtering gains of pixels in the CTU, and indication information whether the CTU needs to be filtered in written into the encoded data of the video frame. In this embodiment of this disclosure, the indication information corresponding to the CTU is referred to as CTU-level switch information.

Based on any foregoing implementation, before step S404, the video encoding method provided in this embodiment of this disclosure further includes the following step: determining, based on a rate distortion optimization (RDO) algorithm and according to a data amount of the indication information and an expected filtering gain obtained by filtering the encoded video frame based on the indication information, that the encoded video frame needs to be filtered during decoding.

Figure 4B:
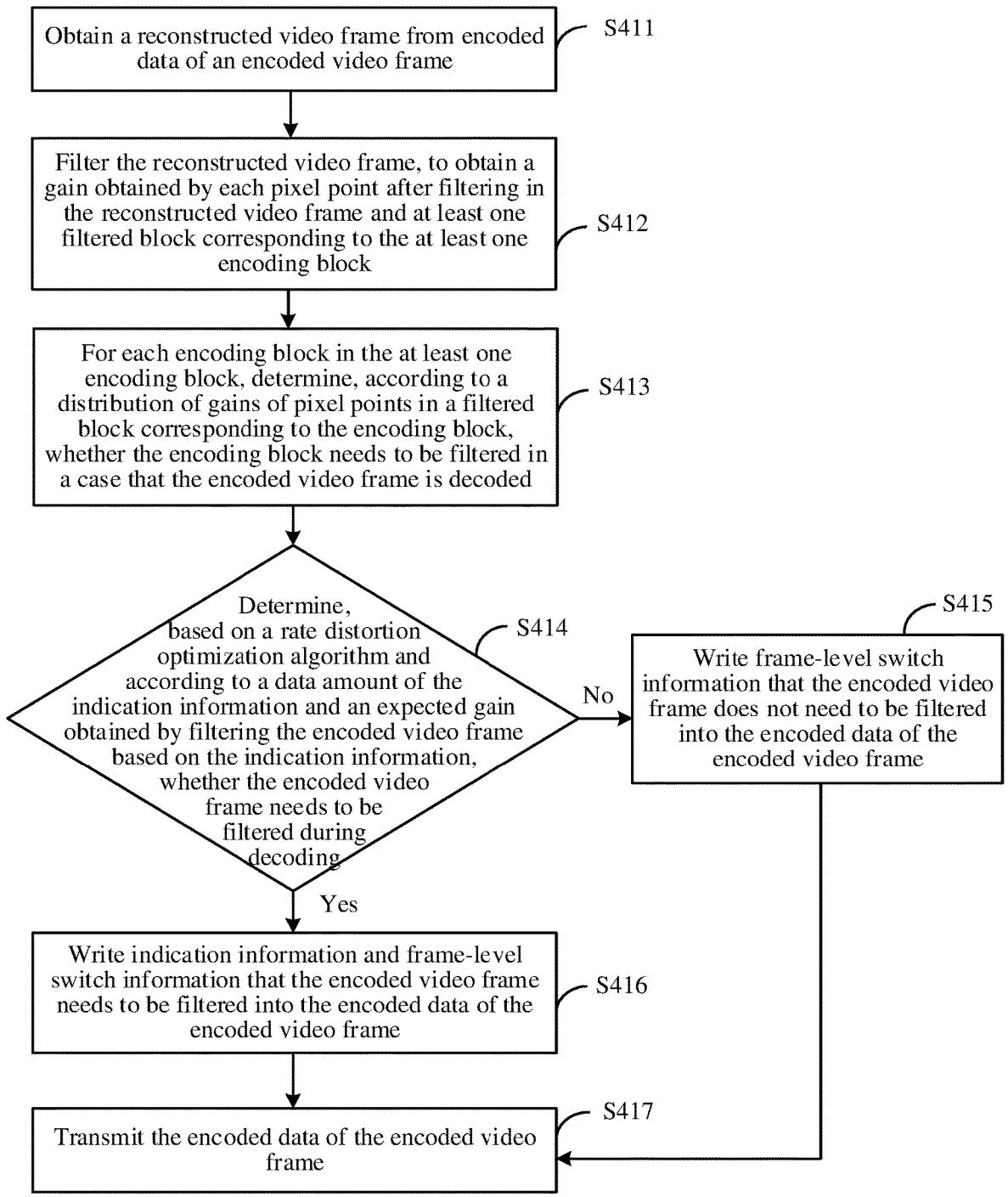
FIG. 4B is a schematic flowchart of an example video encoding method according to an embodiment of this disclosure.

Specifically, Referring to FIG. 4B, an embodiment of this disclosure provides another video encoding method, including the following steps:

S411: Obtain a reconstructed video frame from encoded data of an encoded video frame.

The encoded video frame in step S411 includes at least two encoding blocks, and the encoding block herein does not include a frame-level block.

S412: Filter the reconstructed video frame, to obtain a filtering gain of each pixel after filtering in the reconstructed video frame and at least one filtered block corresponding to the at least one encoding block.

S413: For each encoding block in the at least one encoding block, determine, according to a distribution of filtering gains of pixels in a filtered block corresponding to the encoding block, whether the encoding block needs to be filtered in a case that the encoded video frame is decoded.

Encoding blocks that need to be filtered in the encoded video frame are determined based on step S413, and switch information corresponding to the encoding blocks that need to be filtered is set as "on", namely, indication information for the encoding blocks (frame-level blocks are not included herein) is obtained.

S414: Determine, based on a rate distortion optimization algorithm and according to a data amount of the indication information and an expected filtering gain obtained by filtering the encoded video frame based on the indication information, whether the encoded video frame needs to be filtered during decoding. Step S416 is performed if the encoded video frame needs to be filtered during decoding; and Step S415 is performed if the encoded video frame does not need to be filtered during decoding.

The indication information in step S414 is the indication information for encoding blocks obtained based on step S413.

The RDO is a method for improving the compression video quality of a video, and this name is for a data amount (a rate) and an optimization distortion amount (video quality losses) required for video encoding. The RDO can reduce a data amount of a video after encoding while improving the quality of video encoding, namely, balance a video size and video quality to make an optimal encoding decision. Whether the reconstructed video frame needs to be filtered by a decoder during decoding is determined according to a RDO algorithm existing in a codec or an encoding and decoding standard. A video encoder may determine whether the encoded video frame is worthy to be filtered by the decoder according to an expected filtering gain brought by filtering the encoded video frame and a data amount increased by writing the indication information into the encoded data of the encoded video frame. During actual application, a data amount of the indication information that needs to be added to the encoded data of the encoded video frame may be determined based on the quantity of the encoding blocks that needs to be filtered determined through step S413. For example, indication information of each encoding block needs to occupy a data amount of m bits, and if T encoding blocks need to be filtered, a data amount of T×m bits is added. The reconstructed video frame may be obtained from the encoded data of the encoded video frame, the block that needs to be filtered in the reconstructed video frame is filtered based on the indication information, the filtering gains obtained by the pixels after filtering in the video frame are obtained, and the filtering gains of the pixels are accumulated to obtain the expected filtering gain obtained by filtering the encoded video frame based on the indication information.

S415: Write frame-level switch information that the encoded video frame does not need to be filtered into the encoded data of the encoded video frame, and perform step S417.

In a case that frame-level switch information that the encoded video frame does not need to be filtered is written into the encoded data of the encoded video frame, it indicates that the video decoder side does not need to filter the encoded video frame, and the indication information does not need to be written into the encoded data of the encoded video frame.

During specific implementation, if the video encoder side determines that the video decoder side does not need to filter the encoded video frame, the frame-level switch frame_flag corresponding to the encoded video frame is set as 0, and frame-level switch information is written as frame-level indication information into the encoded data of the encoded video frame. In a case that the frame-level switch frame_flag corresponding to the encoded video frame is 0, the video decoder side may not filter the encoded video frame.

S416: Write indication information and frame-level switch information that the encoded video frame needs to be filtered into the encoded data of the encoded video frame, and perform step S417.

During specific implementation, if the video encoder side determines that the video decoder side needs to filter the encoded video frame, the frame-level switch frame_flag corresponding to the encoded video frame is set as 1, and frame-level switch information is written as frame-level indication information into the encoded data of the encoded video frame. Meanwhile, indication information for blocks determined based on step S413 is also written into the encoded data of the encoded video frame.

S417: Transmit the encoded data of the encoded video frame.

The video encoder side further determines, based on the determined indication information and an expected filtering gain brought by the indication information, whether to instruct to filter the encoded video frame, to improve the accuracy of determination on the encoded video frame.

Figure 5:
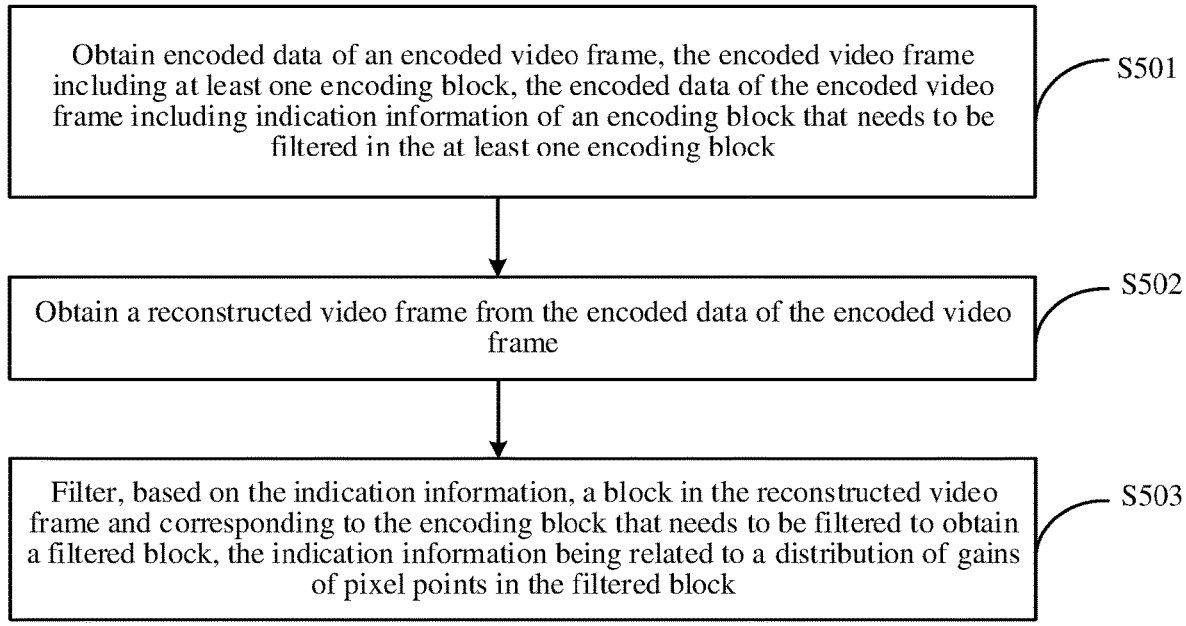
FIG. 5 is a schematic flowchart of an example video decoding method according to an embodiment of this disclosure.

Referring to FIG. 5, an embodiment of this disclosure further provides a video decoding method, including:

S501: Obtain encoded data of an encoded video frame, the encoded video frame including at least one encoding block, the encoded data of the encoded video frame including indication information of an encoding block that needs to be filtered in the at least one encoding block.

S502: Obtain a reconstructed video frame from the encoded data of the encoded video frame.

S503: Filter, based on the indication information, a block in the reconstructed video frame and corresponding to the encoding block that needs to be filtered to obtain a filtered block, the indication information being related to a distribution of filtering gains of pixels in the filtered block.

The filtering may be, for example, CNNLF processing.

According to this embodiment of this disclosure, in the encoded data of the encoded video frame obtained by the video decoder side (for example, received from the video encoder side), indication information of each encoding block that needs to be filtered is transmitted to the video decoder side after the video encoder side determines a distribution of filtering gains obtained by pixels after filtering in a block of a reconstructed video frame corresponding to the encoding block. The video decoder side uses filtering corresponding to or the same as that of the video encoder side in a case that a reconstructed video frame is obtained from the encoded data of the encoded video frame and a block in the reconstructed video frame and corresponding to the encoding block that needs to be filtered in the encoded video frame is filtered to obtain a filtered block. Therefore, the distribution of the filtering gains of the pixels in the filtered block at the video decoder side corresponds to the distribution of the filtering gains obtained by the pixels after filtering in the block corresponding to the reconstructed video frame at the video encoder side. The video decoder side may deduce the indication information of the encoding block in the encoded data of the encoded video frame according to the distribution of the filtering gains of the pixels in the filtered block.

During specific implementation, for example, at the video decoder side, indication information of each encoding block is determined in the following manner: determining a ratio of a positive filtering gain of the filtered block according to the distribution of the filtering gains of the pixels in the filtered block corresponding to the encoding block. and in a case that the ratio of the positive filtering gain is less than a filtering gain ratio threshold, determining that the encoding block does not need to be filtered in a case that the encoded video frame is decoded, or otherwise, determining that the encoding block needs to be filtered in a case that the encoded video frame is decoded. Correspondingly, at the video decoder side, a ratio of a positive filtering gain of the filtered block is greater than or equal to a filtering gain ratio threshold, and the ratio of the positive filtering gain of the filtered block may be determined according to the distribution of the filtering gains of the pixels in the filtered block.

During specific implementation, for example, the ratio of the positive filtering gain of the filtered block is determined in the following manner: determining an absolute value of a sum of filtering gains of pixels whose filtering gains are positive in the filtered block as the positive filtering gain of the filtered block; determining an absolute value of a sum of filtering gains of pixels whose filtering gains are negative in the filtered block as a negative filtering gain of the filtered block; determining a sum of the positive filtering gain and the negative filtering gain of the filtered block as a total filtering gain of the filtered block; and obtaining the ratio of the positive filtering gain of the filtered block according to a ratio of the positive filtering gain of the filtered block to the total filtering gain.

During specific implementation, for example, the filtering gain ratio threshold is determined in the following manner: obtaining a filtering gain statistical feature value according to the distribution of the filtering gains of the pixels in the filtered block; and determining the filtering gain ratio threshold according to the filtering gain statistical feature value.

During specific implementation, the filtering gain ratio threshold may be determined according to a preset mapping relationship between the filtering gain statistical feature value and the filtering gain ratio threshold.

During actual application, for a specific implementation for determining the indication information, reference may be made to the implementation of the video encoder side, and details are not described herein a filtering gain. During specific implementation, encoded data of each encoded video frame carries indication information, and the indication information is used for indicating an encoding block that needs to be filtered in the encoded video frame. For example, the indication information may include a flag identifier corresponding to each encoding block in an encoded video frame. When the flag of an encoding block is 1, it indicates that the encoding block needs to be filtered during decoding. When the flag of an encoding block is 0, it indicates that the encoding block does not need to be filtered during decoding. In another example, the indication information may include serial numbers of encoding blocks that need to be filtered in the encoded video frame. For example, if the indication information includes serial numbers 1, 4, and 5, the first encoding block, the fourth encoding block, and the fifth encoding block in the encoded video frame need to be filtered.

During specific implementation, the video encoder side writes the indication information into the encoded data of the encoded video frame and transmits the encoded data to the video decoder side. The video decoder side decodes the encoded video frame to obtain a reconstructed video frame, filters a block in the reconstructed video frame and corresponding to the encoding block that needs to be filtered indicated by the indication information based on the indication information in the encoded data of the encoded video frame, and obtains a filtered video frame and plays the filtered video frame.

According to the video decoding method provided in this embodiment of this disclosure, based on the indication information received from the video encoder side, encoding blocks with a relatively great expected filtering gain after filtering may be filtered, and encoding blocks with a relatively small expected filtering gain may not be filtered, so that the calculation resources of the video decoder side are applied to blocks that can generate more apparent filtering gains, thereby reducing the decoding complexity and improving the filtering efficiency.

During specific implementation, the video decoder side may determine, based on frame-level switch information of each encoded video frame, whether the encoded video frame needs to be filtered during decoding. The frame-level switch information and a data amount of the indication information are correlated to the filtering gain of the filtered video frame. For example, if the frame-level switch frame_flag corresponding to an encoded video frame is 0, it indicates that the encoded video frame does not need to be filtered; and if the frame-level switch frame_flag corresponding to an encoded video frame is 1, it indicates that the encoded video frame needs to be filtered. When the frame-level switch frame_flag corresponding to an encoded video frame is 1, filtering is performed according to indication information of blocks of a next level. For example, if a CTU-level switch CTU_flag corresponding to a CTU is 0, it indicates that the CTU does not need to be filtered; and if a CTU-level switch CTU_flag corresponding to a CTU is 1, it indicates that the CTU needs to be filtered.

Figure 6:
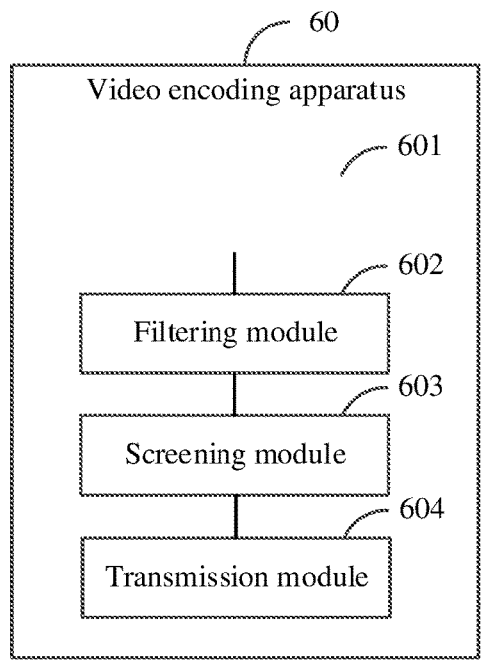
FIG. 6 is a schematic structural diagram of an example video encoding apparatus according to an embodiment of this disclosure.

As shown in FIG. 6, based on the inventive idea the same as that of the foregoing video encoding method, an embodiment of this disclosure further provides a video encoding apparatus 60, including a decoding module 601, a filtering module 602, a screening module 603, and a transmission module 604. The term module (and other similar terms such as unit, submodule, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The decoding module 601 is configured to obtain a reconstructed video frame from encoded data of an encoded video frame, the encoded video frame including at least one encoding block.

The filtering module 602 is configured to filter the reconstructed video frame, to obtain a filtering gain obtained by each pixel after filtering in the reconstructed video frame and at least one filtered block corresponding to the at least one encoding block.

The screening module 603 is configured to: for each encoding block in the at least one encoding block, determine, according to a distribution of filtering gains of pixels in a filtered block corresponding to the encoding block, whether the encoding block needs to be filtered in a case that the encoded video frame is decoded.

The transmission module 604 is configured to transmit the encoded data of the encoded video frame, the encoded data of the encoded video frame including indication information of an encoding block that needs to be filtered.

According to an embodiment of this disclosure, the screening module 603 is specifically configured to:
    determine a ratio of a positive filtering gain of the filtered block according to the distribution of the filtering gains of the pixels in the filtered block; and
    in a case that the ratio of the positive filtering gain of the filtered block is less than a filtering gain ratio threshold, determine that the encoding block does not need to be filtered in a case that the encoded video frame is decoded, or otherwise, determine that the encoding block needs to be filtered in a case that the encoded video frame is decoded.

According to an embodiment of this disclosure, the screening module 603 is specifically configured to:
    determine an absolute value of a sum of filtering gains of pixels whose filtering gains are positive in the filtered block as the positive filtering gain of the filtered block;
    determine an absolute value of a sum of filtering gains of pixels whose filtering gains are negative in the filtered block as a negative filtering gain of the filtered block;
    determine a sum of the positive filtering gain of the filtered block and the negative filtering gain of the filtered block as a total filtering gain of the filtered block; and
    obtain the ratio of the positive filtering gain of the filtered block according to a ratio of the positive filtering gain of the filtered block to the total filtering gain of the filtered block.

According to an embodiment of this disclosure, the screening module 603 is further configured to:
    obtain a filtering gain statistical feature value of the filtered block according to the distribution of the filtering gains of the pixels in the filtered block; and determine the filtering gain ratio threshold according to the filtering gain statistical feature value of the filtered block.

According to an embodiment of this disclosure, the screening module 603 is specifically configured to:

obtain the filtering gain ratio threshold corresponding to the filtering gain statistical feature value according to a preset mapping relationship between the filtering gain statistical feature value and the filtering gain ratio threshold.

According to an embodiment of this disclosure, the video encoding apparatus 60 further includes a video frame screening module configured to: before execution of the transmission module 604, determine, based on a rate distortion optimization algorithm and according to a data amount of the indication information and an expected filtering gain obtained by filtering the encoded video frame based on the indication information, whether the encoded video frame needs to be filtered during decoding; in a case that the encoded video frame needs to be filtered, write indication information and frame-level switch information that the encoded video frame needs to be filtered into the encoded data of the encoded video frame, and execute functions corresponding to the transmission module 604; and. in a case that the encoded video frame does not need to be filtered, write frame-level switch information that the encoded video frame does not need to be filtered into the encoded data of the encoded video frame, and execute functions corresponding to the transmission module 604.

The video encoding apparatus provided in this embodiment of this disclosure and the foregoing video encoding method use the same inventive idea, and the same beneficial effects can be obtained. Details are not described herein a filtering gain.

Figure 7:
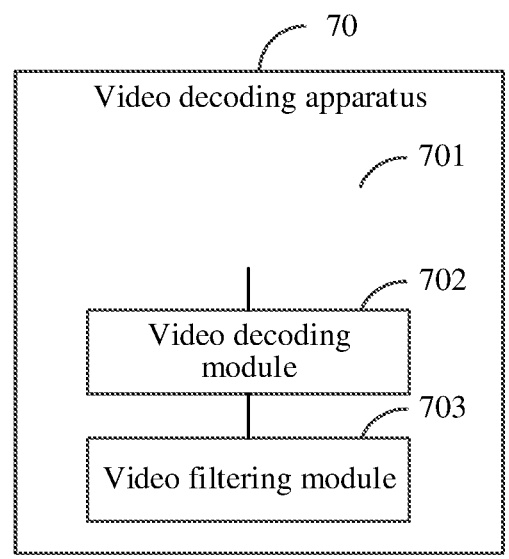
FIG. 7 is a schematic structural diagram of an example video decoding apparatus according to an embodiment of this disclosure.

As shown in FIG. 7, based on the inventive idea the same as that of the foregoing video decoding method, an embodiment of this disclosure further provides a video decoding apparatus 70, including an obtaining module 701, a video decoding module 702, and a video filtering module 703.

The obtaining module 701 is configured to obtain encoded data of an encoded video frame, the encoded video frame including at least one encoding block, the encoded data of the encoded video frame including indication information of an encoding block that needs to be filtered in the at least one encoding block.

The video decoding module 702 is configured to obtain a reconstructed video frame from the encoded data of the encoded video frame.

The video filtering module 703 is configured to filter, based on the indication information, a block in the reconstructed video frame and corresponding to the encoding block that needs to be filtered to obtain a filtered block, the indication information being related to a distribution of filtering gains of pixels in the filtered block.

According to an embodiment of this disclosure, for example, at the video encoder side, indication information of each encoding block is determined in the following manner:

determining a ratio of a positive filtering gain of the filtered block according to the distribution of the filtering gains of the pixels in the filtered block corresponding to the encoding block; and in a case that the ratio of the positive filtering gain of the filtered block is less than a filtering gain ratio threshold, determining that the encoding block does not need to be filtered in a case that the encoded video frame is decoded, or otherwise, determining that the encoding block needs to be filtered in a case that the encoded video frame is decoded.

Correspondingly, at the video decoder side, a ratio of a positive filtering gain of the filtered block is greater than or equal to a filtering gain ratio threshold, and the ratio of the positive filtering gain of the filtered block is determined according to the distribution of the filtering gains of the pixels in the filtered block.

According to an embodiment of this disclosure, the ratio of the positive filtering gain of the filtered block is determined in the following manner:

determining an absolute value of a sum of filtering gains of pixels whose filtering gains are positive in the filtered block as the positive filtering gain of the filtered block;

determining an absolute value of a sum of filtering gains of pixels whose filtering gains are negative in the filtered block as a negative filtering gain of the filtered block;

determining a sum of the positive filtering gain and the negative filtering gain of the filtered block as a total filtering gain of the filtered block; and obtaining the ratio of the positive filtering gain of the filtered block according to a ratio of the positive filtering gain of the filtered block to the total filtering gain.

According to an embodiment of this disclosure, the filtering gain ratio threshold is determined in the following manner:

obtaining a filtering gain statistical feature value of the filtered block according to the distribution of the filtering gains of the pixels in the filtered block; and determining the filtering gain ratio threshold according to the filtering gain statistical feature value of the filtered block.

According to an embodiment of this disclosure, the filtering gain ratio threshold is determined according to a preset mapping relationship between the filtering gain statistical feature value and the filtering gain ratio threshold.

According to an embodiment of this disclosure, the encoded data of the encoded video frame further includes frame-level switch information, and the frame-level switch information and a data amount of the indication information are correlated to the filtering gain of the filtered video frame. At the video encoder side, the frame-level switch information is indication information whether the encoded video frame needs to be filtered during decoding determined based on a rate distortion optimization algorithm and according to a data amount of the indication information and an expected filtering gain obtained by filtering the encoded video frame based on the indication information.

The video decoding apparatus provided in this embodiment of this disclosure and the foregoing video decoding method use the same inventive idea, and the same beneficial effects can be obtained. Details are not described herein a filtering gain.

Figure 8:
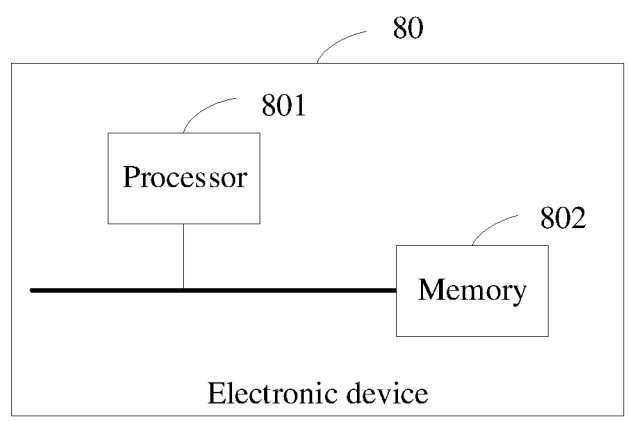
FIG. 8 is a schematic structural diagram of an example electronic device according to an embodiment of this disclosure.

Based on the inventive idea that is the same as the foregoing video encoding method, an embodiment of this disclosure further provides an electronic device, and the electronic device specifically may be the terminal device or the server shown in FIG. 3. As shown in FIG. 8, the electronic device 80 may include a processor 801 and a memory 802.

The processor 801 may be a general purpose processor, such as a central processing unit (CPU), a digital signal processor (DSP), an application specific integrated circuit (ASIC), a field programmable gate array (FPGA), or another programmable logic device, a discrete gate or transistor logic device, or a discrete hardware component. The processor may implement or perform the methods, the steps, and logical block diagrams that are disclosed in the embodiments of this disclosure. The general purpose processor may be a microprocessor or any conventional processor. Steps of the methods disclosed with reference to the embodiments of this disclosure may be directly performed and completed by a hardware processor, or may be performed and completed by using a combination of hardware and a software module in the processor.

The memory 802, as a non-transitory computer-readable storage medium, may be configured to store a non-transitory software program, a non-transitory computer-executable program, and a module. The memory may include at least one type of storage media, for example, may include: a flash memory, a hard disk, a multimedia card, a card type memory, a random access memory (RAM), a static random access memory (SRAM), a programmable read-only memory (PROM), a read-only memory (ROM), an electrically erasable programmable read-only memory (EEPROM), a magnetic memory, a magnetic disk, an optical disc, and the like. The memory is any other medium that can carry or store expected program code in a form of an instruction or a data structure and can be accessed by a computer, but is not limited thereto. The memory 802 according to this embodiment of this disclosure may be further a circuit or any other apparatus that can implement a storage function, and is configured to store program instructions and/or data.

An embodiment of this disclosure provides a computer-readable storage medium, configured to store computer program instructions used by the foregoing electronic device, and including a program for performing the foregoing video encoding method or the foregoing video decoding method.

The foregoing computer-readable storage medium may be any computer-accessible usable medium or a data storage device, includes but not limited to: a magnetic memory (for example, a floppy disk, a hard disk, a magnetic tape, or a magneto-optical (MO) disk), an optical memory (for example, a CD, a DVD, a BD, or an HVD), and a semiconductor memory (for example, a ROM, an EPROM, an EEPROM, a non-volatile memory (NAND FLASH), or a solid-state disk (SSD)).

An embodiment of this disclosure further provides a computer program product, including a computer program stored on a computer-readable storage medium, the computer program including program instructions, the program instructions, when executed by a processor, implementing the operations in the foregoing video encoding method or the foregoing video decoding method.

The foregoing embodiments are merely used for describing the technical solutions of this disclosure. The descriptions of the foregoing embodiments are merely intended to help understand the methods of the embodiments of this disclosure, and are not to be construed as a limitation on the embodiments of this disclosure. Any variation or replacement readily figured out by a person skilled in the art is to fall within the protection scope of the embodiments of this disclosure.

What is claimed is:

1. A video encoding method, comprising:
    obtaining a reconstructed video frame from encoded data of an encoded video frame, the encoded video frame comprising at least one encoding block;
    filtering the reconstructed video frame, to obtain a filtering gain of each pixel of the at least one encoding block;
    for an encoding block in the at least one encoding block, determining, according to a distribution of filtering gains among pixels within the encoding block, whether the encoding block is to be filtered when being decoded at a decoder; and
    in response to determining that the encoding block is to be filtered when being decoded at the decoder, including into the encoded data of the encoded video frame an indication information for indicating that the encoding block is to be filtered into the encoded data.

2. The method according to claim 1, wherein determining, according to the distribution of filtering gains among pixels within the encoding block, whether the encoding block is to be filtered when being decoded at the decoder comprises:
    determining a positive ratio as a ratio of a number of positive filtering gains to a number of total filtering gains of the encoded block according to the distribution of the filtering gains of the pixels of the encoded block; and
    when the positive ratio is less than a filtering gain ratio threshold, determining that the encoding block is not to be filtered when being decoded at the decoder, otherwise, determining that the encoding block is to be filtered when being decoded at the decoder.

3. The method according to claim 2, wherein determining the positive ratio comprises:
    determining a first absolute value of a sum of filtering gains of pixels with positive filtering gains as a positive filtering gain value of the encoded block;
    determining a second absolute value of a sum of filtering gains of pixels with negative filtering gains as a negative filtering gain value of the encoded block;
    determining a sum of the positive filtering gain value of the encoded block and the negative filtering gain value of the encoded block as a total filtering gain of the encoding block; and
    obtaining the positive ratio of as a ratio of the positive filtering gain value to the total filtering gain of the encoded block.

4. The method according to claim 2, further comprising:
    obtaining a filtering gain statistical feature value of the encoding block according to the distribution of the filtering gains of the pixels of the encoded block; and
    determining the filtering gain ratio threshold according to the filtering gain statistical feature value.

5. The method according to claim 4, wherein determining the filtering gain ratio threshold according to the filtering gain statistical feature value comprises:
    obtaining the filtering gain ratio threshold corresponding to the filtering gain statistical feature value according to a preset mapping relationship between the filtering gain statistical feature value and the filtering gain ratio threshold.

6. The method according to claim 1, wherein before including the indication information into the encoded data, the method further comprises:
    determining, based on a rate distortion optimization (RDO) algorithm and according to a data amount of the indication information for the at least one encoding block and an expected filtering gain of filtering the encoded video frame based on the indication information of the at least one encoding block, that the encoded video frame is to be filtered when being decoded at the decoder.

7. A video decoding method, comprising:
obtaining encoded data of an encoded video frame, the encoded video frame comprising at least one encoding block, the encoded data of the encoded video frame comprising indication information of an encoding block among the at least one encoding block that is to be filtered after reconstruction;
obtaining a reconstructed video frame from the encoded data of the encoded video frame; and
filtering, based on the indication information, a reconstructed block of the encoding block that is to be filtered to obtain a filtered block, the indication information being related to a distribution of filtering gains among pixels within the encoding block.

8. The method according to claim 7, wherein a ratio of a positive filtering gain of the encoding block is greater than or equal to a filtering gain ratio threshold, the ratio of the positive filtering gain of the encoding block being determined according to the distribution of the filtering gains among pixels within the encoded block.

9. The method according to claim 8, wherein the ratio of the positive filtering gain of the filtered block is determined by:
determining a first absolute value of a sum of filtering gains of pixels having positive filtering gains in the encoded block as a positive filtering gain value of the encoded block;
determining a second absolute value of a sum of filtering gains of pixels having negative filtering gains in the encoded block as a negative filtering gain value of the encoded block;
determining a sum of the positive filtering gain value the negative filtering gain value of the encoded block as a total filtering gain; and
obtaining the ratio of the positive filtering gain of the encoded block as a ratio of the positive filtering gain value to the total filtering gain of the encoded block.

10. The method according to claim 8, wherein the filtering gain ratio threshold is determined by:
obtaining a filtering gain statistical feature value of the encoding block according to the distribution of the filtering gains of the pixels of the encoding block; and
determining the filtering gain ratio threshold according to the filtering gain statistical feature value.

11. The method according to claim 10, wherein the filtering gain ratio threshold is determined according to a preset mapping relationship between the filtering gain statistical feature value and the filtering gain ratio threshold.

12. A video encoding device, comprising a memory for storing computer instructions and a processor in communication with the memory, wherein the processor, when executing the computer instructions, is configured to cause the video encoding device to:
obtain a reconstructed video frame from encoded data of an encoded video frame, the encoded video frame comprising at least one encoding block;
filter the reconstructed video frame, to obtain a filtering gain of each pixel of the at least one encoding block;
for an encoding block in the at least one encoding block, determine, according to a distribution of filtering gains among pixels within the encoding block, whether the encoding block is to be filtered when being decoded at a decoder; and
in response to determining that the encoding block is to be filtered when being decoded at the decoder, include into the encoded data of the encoded video frame an indication information for indicating that the encoding block is to be filtered into the encoded data.

13. The video encoding device according to claim 12, wherein to determining, according to the distribution of filtering gains among pixels within the encoding block, whether the encoding block is to be filtered when being decoded at the decoder comprises:
to determine a positive ratio as a ratio of a number of positive filtering gains to a number of total filtering gains of the encoded block according to the distribution of filtering gains of the pixels of the encoded block; and
when the positive ratio is less than a filtering gain ratio threshold, to determine that the encoding block is not to be filtered when being decoded at the decoder, otherwise, determining that the encoding block is to be filtered when being decoded at the decoder.

14. The video encoding device according to claim 13, wherein to determine the positive ratio comprises:
to determine a first absolute value of a sum of filtering gains of pixels with positive filtering gains as a positive filtering gain value of the encoded block;
to determine a second absolute value of a sum of filtering gains of pixels with negative filtering gains as a negative filtering gain value of the encoded block;
to determine a sum of the positive filtering gain value of the encoded block and the negative filtering gain value of the encoded block as a total filtering gain of the encoding block; and
to obtain the positive ratio of as a ratio of the positive filtering gain value to the total filtering gain of the encoded block.

15. The video encoding device according to claim 13, wherein the processor, when executing the computer instructions, is further configured to cause the video encoding device to:
obtain a filtering gain statistical feature value of the encoding block according to the distribution of filtering gains among pixels within the encoded block; and
determine the filtering gain ratio threshold according to the filtering gain statistical feature value.

16. The video encoding device according to claim 15, wherein to determine the filtering gain ratio threshold according to the filtering gain statistical feature value comprises:
to obtain the filtering gain ratio threshold corresponding to the filtering gain statistical feature value according to a preset mapping relationship between the filtering gain statistical feature value and the filtering gain ratio threshold.

17. The video encoding device according to claim 12, wherein the processor, when executing the computer instructions, is configured, before causing the video encoding device to include the indication information into the encoded data, to cause the video encoding device to:
determine, based on a rate distortion optimization (RDO) algorithm and according to a data amount of the indication information for the at least one encoding block and an expected filtering gain of filtering the encoded video frame based on the indication information of the at least one encoding block, that the encoded video frame is to be filtered when being decoded at the decoder.

18. A video decoding device, comprising a memory for storing computer instructions and a processor in communication with the memory, wherein the processor, when executing the computer instructions, is configured to cause the video encoding device to:

obtain encoded data of an encoded video frame, the encoded video frame comprising at least one encoding block, the encoded data of the encoded video frame comprising indication information of an encoding block among the at least one encoding block that is to be filtered after reconstruction;

obtain a reconstructed video frame from the encoded data of the encoded video frame; and filter, based on the indication information, a reconstructed block of the encoding block that is to be filtered to obtain a filtered block, the indication information being related to a distribution of filtering gains among pixels within the encoding block.

19. A non-transitory computer-readable storage medium, storing computer program instructions, the computer program instructions, when executed by a processor, are configured to implement the method of claim 1.

20. A non-transitory computer-readable storage medium, storing computer program instructions, the computer program instructions, when executed by a processor, are configured to implement the method of claim 7.

* * * * *